US00RE50092E

(19) United States
(12) Reissued Patent
Tarlazzi

(10) Patent Number: US RE50,092 E
(45) Date of Reissued Patent: Aug. 20, 2024

(54) SMALL CELL NETWORK ARCHITECTURE FOR SERVICING MULTIPLE NETWORK OPERATORS

(71) Applicant: Andrew Wireless Systems GmbH, Buchdorf (DE)

(72) Inventor: Luigi Tarlazzi, Boxborough, MA (US)

(73) Assignee: CommScope Technologies LLC, Claremont, NC (US)

(21) Appl. No.: 17/542,188

(22) Filed: Dec. 3, 2021

Related U.S. Patent Documents

Reissue of:
(64) Patent No.: 10,499,388
Issued: Dec. 3, 2019
Appl. No.: 15/946,556
Filed: Apr. 5, 2018

U.S. Applications:
(63) Continuation of application No. 14/897,277, filed as application No. PCT/IB2013/055715 on Jul. 11, 2013, now Pat. No. 9,974,071.

(51) Int. Cl.
*H04W 72/04* (2023.01)
*H04W 28/08* (2023.01)
(Continued)

(52) U.S. Cl.
CPC ..... *H04W 28/08* (2013.01); *H04W 72/29* (2023.01); *H04W 72/51* (2023.01);
(Continued)

(58) Field of Classification Search
CPC ..... H04W 28/08; H04W 72/51; H04W 72/29; H04W 72/541
See application file for complete search history.

(56) References Cited

U.S. PATENT DOCUMENTS 8,149,950 B2 4/2012 Kim et al.
9,125,047 B2 * 9/2015 Sundaresan ..... H04W 16/02
(Continued)

FOREIGN PATENT DOCUMENTS

CN 102572962 A 7/2012
CN 103096395 A 5/2013
(Continued)

OTHER PUBLICATIONS

Liu et al., "The Case for Re-configurable Backhaul in Could-RAN based Small Cell Networks", specification of U.S. Appl. No. 61/676,101, filed Jul. 26, 2012. (Year: 2012).*
(Continued)

*Primary Examiner* — Luke S Wassum
(74) *Attorney, Agent, or Firm* — Fogg & Powers LLC

(57) ABSTRACT

Systems are provided for managing a small cell telecommunication system servicing multiple network operators. In one aspect, a small cell telecommunication system can include management sub-system including a controller, multiple baseband processing units in communication with the controller, a transport module, and multiple remote antenna units. The controller can communicate with multiple core networks. Each core network is operated by a separate network operator for providing telecommunication services to terminal devices. Each of the baseband processing units can process data plane data and control plane data from at least one respective core network. The transport module can communicate signals between the baseband processing units and the remote antenna units of the small cell network. The management sub-system can provide a respective amount of capacity via the small cell network for each core network based on a respective subset of the baseband processing units assigned to the core network.

32 Claims, 4 Drawing Sheets

(51) Int. Cl.

| | |
|---|---|
| ***H04W 72/08*** | (2009.01) |
| ***H04W 72/29*** | (2023.01) |
| ***H04W 72/51*** | (2023.01) |
| ***H04W 72/541*** | (2023.01) |
| *H04W 16/14* | (2009.01) |
| *H04W 84/04* | (2009.01) |

(52) U.S. Cl.
CPC ..... *H04W 72/541* (2023.01); *H04W 16/14* (2013.01); *H04W 84/045* (2013.01)

(56) References Cited

U.S. PATENT DOCUMENTS

| | | | | |
|---|---|---|---|---|
| 9,407,302 | B2 * | 8/2016 | Schmidt | H04W 72/12 |
| 9,974,071 | B2 * | 5/2018 | Tarlazzi | H04W 72/51 |
| 9,974,083 | B2 * | 5/2018 | Serravalle | H04W 16/14 |
| 10,499,388 | B2 * | 12/2019 | Tarlazzi | H04W 28/08 |
| 2004/0185884 | A1 | 9/2004 | Marin et al. | H04W 88/08 455/466 |
| 2005/0213566 | A1 * | 9/2005 | Jutila | H04W 48/18 370/352 |
| 2007/0115180 | A1 | 5/2007 | Kish et al. | |
| 2010/0323711 | A1 * | 12/2010 | Damnjanovic | H04B 7/0626 455/67.11 |
| 2011/0039546 | A1 | 2/2011 | Narasimha et al. | |
| 2012/0039254 | A1 | 2/2012 | Stapleton et al. | H04W 40/00 370/328 |
| 2012/0257585 | A1 * | 10/2012 | Sydor | H04W 72/541 370/329 |
| 2013/0079048 | A1 | 3/2013 | Cai et al. | H04W 48/16 455/517 |
| 2013/0258979 | A1 | 10/2013 | Hulkkonen et al. | |
| 2013/0286851 | A1 * | 10/2013 | Moser | H04W 88/10 370/241.1 |
| 2013/0303114 | A1 * | 11/2013 | Ahmad | H04L 12/1407 455/406 |
| 2014/0148165 | A1 * | 5/2014 | Serravalle | H04W 16/14 455/436 |
| 2014/0254567 | A1 * | 9/2014 | Han | H04W 76/14 370/336 |
| 2014/0269859 | A1 * | 9/2014 | Hanson | H04W 88/085 375/219 |
| 2015/0043437 | A1 * | 2/2015 | Chakraborty | H04W 52/243 370/329 |

FOREIGN PATENT DOCUMENTS

| | | | | |
|---|---|---|---|---|
| EP | 2375803 | A1 | 10/2011 | |
| KR | 20100014339 | A | 2/2010 | |
| WO | 03003771 | A1 | 1/2003 | H04W 88/08 |
| WO | 2004004398 | A1 | 1/2004 | |
| WO | 2008112688 | A1 | 9/2008 | |
| WO | 2012160977 | A1 | 11/2012 | |

OTHER PUBLICATIONS

Hanson et al., "Remote Antenna Unit for Communicating with Base Stations and Mobile Communication Devices", specification of U.S. Appl. No. 61/790,515, filed Mar. 15, 2013. (Year: 2013).*

Sundaresan et al., "FluidNet: A Flexible Cloud-based Radio Access Network for Small Cells", specification of U.S. Appl. No. 61/783,742, filed Mar. 14, 2013. (Year: 2013).*

Australian Patent Office, Office Action from AU Application No. 2013394097 mailed Jul. 13, 2017, from Foreign Counterpart of U.S. Appl. No. 14/897,277, pp. 1-4, Published in AU.

Canadian Intellectual Property Office, "Office Action from CA Application No. 2913186 mailed Jun. 4, 2019", from Foreign Counterpart to U.S. Appl. No. 14/897,277, pp. 1-3, Published: CA.

European Patent Office, "Communication pursuant to Article 94(3) from EP Application No. 13771605.6 mailed Apr. 11, 2019", from Foreign Counterpart to U.S. Appl. No. 14/897,277, pp. 1-5, Published: EP.

European Patent Office, "Extended European Search Report from EP Application No. 21167763.8-1212", from Foreign Counterpart to U.S. Appl. No. 15/946,556, filed Jul. 12, 2021, pp. 1 through 8, Published: EP.

European Patent Office, Office Action from EP Application No. 13771605.6 mailed Feb. 9, 2018, From Foreign Counterpart of U.S. Appl. No. 14/897,277, pp. 1-6, Published in: EP.

International Searching Authority, International Preliminary Report on Patentability for PCT Application No. PCT/IB2013/055715 mailed Jan. 21, 2016, from PCT Counterpart of U.S. Appl. No. 14/897,277; pp. 1-9, Published in WO.

International Searching Authority, International Search Report and Written Opinion from PCT Application No. PCT/IB2013/055715 mailed May 2, 2014, From PCT Counterpart of U.S. Appl. No. 14/897,277; pp. 1-11, Published in WO.

Korean Intellectual Property Office, "Notice of Non-Final Rejection from KR Application No. 10-2016-7002040 mailed Jun. 28, 2019", from Foreign Counterpart to U.S. Appl. No. 14/897,277, pp. 1-9, Published: KR.

State Intellectual Property Office of the Peoples's Republic of China, "Notification of the First Office Action from CN Application 201380078093.3 mailed Aug. 13, 2018", "from Foreign Counterpart of U.S. Appl. No. 14/897,277", filed Aug. 13, 2018, pp. 1-13, Published in: CN.

State Intellectual Property Office, P.R. China, "Office Action from CN Application No. 201380078093.3 dated Dec. 29, 2018", from Foreign Counterpart to PCT Application No. PCT/IB2013/055715, Dec. 29, 2018, pp. 1-7, Published: CN.

United States Patent and Trademark Office, "Advisory Action from U.S. Appl. No. 14/897,277 mailed Nov. 9, 2017"; pp. 1-9, Published in US.

United States Patent and Trademark Office, "Final Office Action from U.S. Appl. No. 14/897,277 mailed Aug. 29, 2017"; pp. 1-16, Published in US.

United States Patent and Trademark Office, "Notice of Allowance from U.S. Appl. No. 14/897,277 mailed Jan. 11, 2018"; pp. 1-12, Published in US.

United States Patent and Trademark Office, "Office Action from U.S. Appl. No. 14/897,277 mailed Mar. 2, 2017"; pp. 1-25, Published in US.

United States Patent and Trademark Office, "Notice of Allowance from U.S. Appl. No. 15/946,556 mailed Apr. 17, 2019"; pp. 1-9, Published in US.

United States Patent and Trademark Office, "Notice of Allowance from U.S. Appl. No. 15/946,556 mailed Sep. 5, 2019"; pp. 1-9, Published in US.

United States Patent and Trademark Office, "Office Action from U.S. Appl. No. 15/946,556 mailed Jan. 8, 2019"; pp. 1-19, Published in US.

European Patent Office, "Extended European Search Report", from EP Application No. 23194220.2, from Foreign Counterpart to U.S. Appl. No. 14/897,277, filed Dec. 5, 2023, pp. 1 through 12, Published: EP.

Australian Patent Office, Office Action from AU Application No. 2013394097 dated Jul. 13, 2017, From Foreign Counterpart of U.S. Appl. No. 14/897,277, pp. 1-4, Published in AU.

* cited by examiner

SMALL CELL NETWORK ARCHITECTURE FOR SERVICING MULTIPLE NETWORK OPERATORS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This [application] *Reissue Application is a reissue of application Ser. No. 15/946,556, filed Apr. 5, 2018, which issued as U.S. Pat. No. 10,499,388, and which* is a continuation of U.S. patent application Ser. No. 14,897,277 filed on Dec. 10, 2015, and titled "SMALL CELL NETWORK ARCHITECTURE FOR SERVICING MULTIPLE NETWORK OPERATORS", which is a U.S National Stage Application of PCT Application No. PCT/IB2013/055715 filed on Jul. 11, 2013, and titled "SMALL CELL NETWORK ARCHITECTURE FOR SERVICING MULTIPLE NETWORK OPERATORS", the contents of both of which are incorporated herein in their entirety.

TECHNICAL FIELD

This disclosure relates generally to telecommunication systems and more particularly relates to a small cell network architecture for servicing multiple network operators.

BACKGROUND

Small cell networks may be deployed in buildings or other environments for extending the range of a cellular communication system or other telecommunication system. A small cell network can include a cluster of access points (e.g., femtocell base stations, picocell base stations, etc.) that utilize relatively few radio frequencies to provide service from a telecommunications network operator. A small cell network may also include a controller that communicates with the access points over a local area network, such as an Ethernet-based network.

Prior solutions for implementing small cell networks present disadvantages. For example, providing services from multiple network operators in a common building or other structure via small cell networks may involve providing a parallel network architecture for each network operator. Providing a parallel network architecture may involve adding network hardware such as a separate local controller for handling traffic from each network operator using the small cell network as well as additional cabling and access points for transceiving signals from terminal devices serviced by the small cell networks.

SUMMARY

Certain aspects and features of the present invention are directed to a small cell network architecture for servicing multiple network operators.

In one aspect, a management sub-system is provided for managing a small cell network servicing multiple network operators. The management sub-system can include a controller and multiple baseband processing units in communication with the controller. The controller can communicate with multiple core networks. Each core network is operated by a separate network operator for providing telecommunication services to terminal devices. The baseband processing units can communicate with the controller. Each of the baseband processing units can process data plane data and control plane data from one or more of the core networks for distribution via remote antenna units of the small-network. The management sub-system can provide a respective amount of capacity via the small cell network for each core network based on a respective subset of the baseband processing units assigned to the core network.

In another aspect, a small cell telecommunication system for servicing multiple network operators is provided. The small cell telecommunication system can include a management sub-system and multiple remote antenna units. The management sub-system can include a controller and multiple baseband processing units in communication with the controller. The controller can communicate with multiple core networks. Each core network is operated by a separate network operator for providing telecommunication services to terminal devices. Each of the baseband processing units can process data plane data and control plane data from a respective core network. The management sub-system can provide a respective amount of capacity via the small cell network for each core network based on a respective subset of the baseband processing units assigned to the core network. The transport module can communicate signals between the baseband processing units and the remote antenna units of the small cell network.

These illustrative aspects and features are mentioned not to limit or define the invention, but to provide examples to aid understanding of the concepts disclosed in this application. Other aspects, advantages, and features of the present invention will become apparent after review of the entire application.

DETAILED DESCRIPTION

Figure 1:
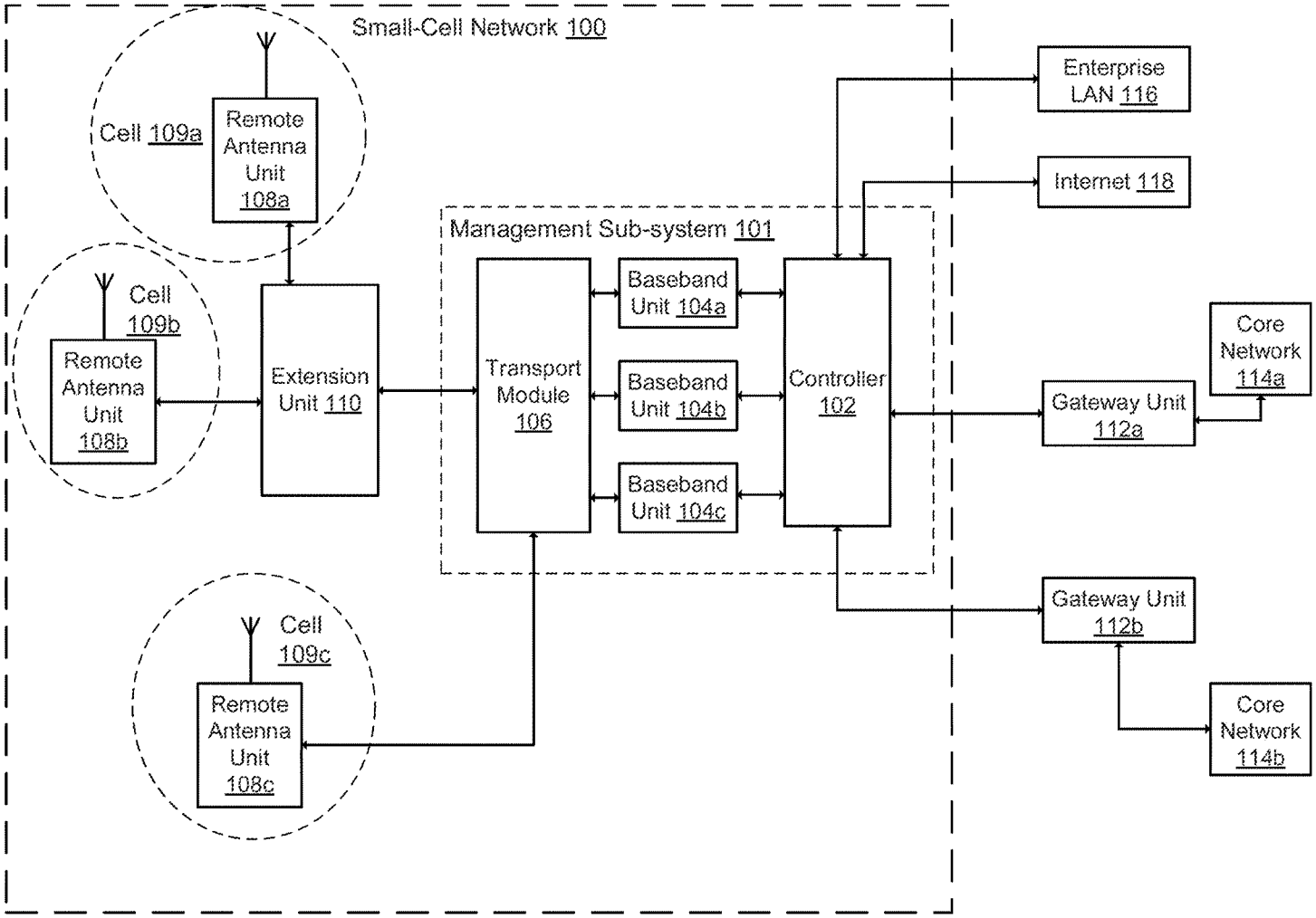
FIG. 1 is a block diagram depicting a small cell network having a management sub-system for interfacing the small cell network to other networks according to one aspect.

Certain aspects and features of the present invention are directed to providing a small cell network with a single controller and usable by multiple network operators. Such a small cell network can be deployed in buildings or other suitable environments.

The architecture for a small cell network that is usable by multiple network operators can include a controller located in the building or other structure serviced by small-network, multiple baseband processing units, and a transport module. The controller can provide an interface between the core networks of multiple network operators and the small cell network. The baseband processing units can perform processing at lower protocol layers (e.g., physical layer, media access control, radio resource control, etc.) of signals and/or data received from the core networks via the controller. The transport module can provide a common interface between the baseband processing units and remote antenna units or suitable other RF front-end devices. The remote antenna units or suitable other RF front-end devices can transmit downlink signals to and receive uplink signals from terminal devices. The controller, the baseband processing units, and the transport module can provide a centralized architecture for communicating signals from different network operators across a common wideband small cell network.

In accordance with some aspects, a small cell telecommunication system for servicing multiple network operators is provided. The small cell telecommunication system can include a controller, multiple baseband processing units in communication with the controller, a transport module, and multiple remote antenna units. The controller can communicate with multiple core networks. Each core network can be operated by a separate network operator for providing telecommunication services to terminal devices. Each of the baseband processing units can process data plane and control plane data. Each of the baseband processing units can perform physical layer processing, media access control, and/or radio resource control for a respective core network. The transport module can communicate signals between the baseband processing units and the remote antenna units of the small cell network.

As used herein, the term "small cell network" can refer to telecommunication system including one or more low-powered RF transceiver systems, devices, access point or other RF front-end device that can operate in licensed and/or unlicensed frequency spectra over short ranges. For example, an RF front-end device may have a have a range of 10 meters to 1-2 kilometers. A small cell network may be installed in a building or other suitable deployment environment.

As used herein, the term "network operator" can refer to an entity that is a provider of wireless communications services. A network operator may own, operate, control, or otherwise manage one or more elements or a telecommunication network infrastructure. Non-limiting examples of infrastructure elements of a telecommunication network include wireless network infrastructure, back haul infrastructure, provisioning and repair systems, and the like.

As used herein, the term "core network" can refer to a device, group of devices, and/or one or more sub-systems in a telecommunication network that can provide services to users of the telecommunications network. Examples of services provided by a core network include frequency spectrum allocation, call aggregation, authentication of terminal devices or users, call switching, service invocation, gateways to other networks, etc.

As used herein, the term "terminal device" can refer to an electronic device used to communicate voice and/or data via a telecommunications system, such as (but not limited to) a small cell network or other cellular network. Other terminology used to refer to terminal devices and non-limiting examples of such devices can include mobile stations, mobile devices, access terminals, subscriber stations, terminal mobile terminals, remote stations, user terminals, terminals, subscriber units, cellular phones, smart phones, personal digital assistants ("PDAs"), laptop computers, netbooks, e-readers, wireless modems, etc.

As used herein, the term "data plane" can refer to a plane in a telecommunications architecture that is used for communicating network user traffic, such as voice and other data to be displayed or used by users of terminal devices. Non-limiting examples and alternative terms for referring to the data plane include a user plane, a forwarding plane, a carrier plane, a bearer plane, etc.

As used herein, the term "control plane" can refer to a plane in a telecommunications architecture that is used for communicating signaling traffic such as control packets for establishing end-to-end communication channels between a core network and a terminal device.

Detailed descriptions of certain aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative embodiments but, like the illustrative embodiments, should not be used to limit the present invention.

FIG. 1 is a block diagram depicting a small cell network 100 having a management sub-system 101 for interfacing the small cell network 100 to other networks. The small cell network 100 can include the management sub-system 101 and remote antenna units 108a-c respectively servicing cells 109a-c. The management sub-system 101 can include a controller 102, baseband units 104a-c, and a transport module 106.

In some aspects, the controller 102, the baseband units 104a-c, and the transport module 106 can be co-located in a room or other area used for housing head-end equipment that manages the small cell network 100. For example, the components of the management sub-system 101 can be installed in a rack that includes a sub-rack for the controller 102, a sub-rack for the baseband units 104a-c, and the transport module 106.

The controller 102 can provide a standard interface for communicating with different core networks 114a, 114b used by different network operators. In some aspects, the core networks 114a, 114b can be managed by the different network operators. The controller 102 can manage the baseband units 104a-c and the transport module 106.

The controller 102 can also manage the backhaul links to core networks 114a, 114b of the network operators using the small cell network 100. Backhaul links can include communication links between a core network or backbone network and the small cell network 100. The backhaul links to the core networks 114a, 114b can include the gateway units 112a, 112b and/or other suitable small cell gateway devices. The links to the core networks 114a, 114 can be established via any suitable architecture, such as (but not limited to) S1, Iuh, 3GPP interfaces, and the like. The gateway units 112a, 112b can respectively manage communication between core networks 114a, 114b and the different small cells 109a-c. In additional or alternative aspects, the gateway units 112a, 112b can be omitted and the controller 102 can communicate directly with the core networks 114a, 114b.

The baseband units 104a-c can manage lower layer protocol functions for data communicated via the small cell network 100 using any suitable telecommunication standard. In some aspects, the baseband units 104a-c may perform processing for networking layers 1-3. Layer 1 processing can include physical ("PHY") layer processing. Layer 2 processing can include media access control ("MAC") layer processing, radio link control ("RLC") processing, and/or packet data convergence protocol ("PDCP") processing. Layer 3 processing can include radio resource control ("RRC") layer processing. In additional or alternative aspects, the controller 102 can perform layer 2 processing and layer 3 processing. Non-limiting examples of suitable telecommunication standards include 3G and 4G standards. A baseband unit for a given network operator can communicate with one of the core networks 114a, 114b via the controller 102. In some aspects, each of the baseband units 104a-c can manage lower layer protocol functions for a respective network operator. In other aspects, the processing resources of two or more of the baseband units 104a-c can be combined for managing lower layer protocol functions for a given network operator.

In some aspects, multiple baseband units 104a-c can be implemented on a common chip, interface card, circuit board, or other hardware device having multiple central processing unit ("CPU") cores and/or multiple digital signal processor ("DSP") cores and related hardware accelerators. For example, multiple baseband units may be implemented on a multi-core system on chip ("SoC") circuit board. In other aspects, the baseband units 104a-c can be implemented using separate circuit boards, interface cards, or other hardware devices.

The management sub-system 101 can provide scalable capacity for the small-cell network 100. The capacity of the small cell network 100 can be modified by increasing or decreasing the number of baseband units included in the management sub-system 101. The number of baseband units used to perform processing for a given network operator can be determined based on the number of cells 109a-c used by the network operator and the number of terminal devices serviced by the network operator via the small cell network 100. For example, a number of terminal devices that can communicate via the small cell network 100 using telecommunication services provided by a given network operator can be determined based on the number of baseband processing units used to perform baseband processing for the network operator. The number of supported terminal devices can be increased by additional baseband processing unit(s) to the management sub-system 101 and interfacing the additional baseband processing unit(s) with the controller 102 and the transport module 106. Modifying the number of baseband units that perform processing for each network operator can modify the capacity provided by the small cell network 100 for the network operator.

The baseband units 104a-c can communicate with the remote antenna units 108a-c via the transport module 106. In some aspects, the transport module 106 can communicate with remote antenna units 108a-c via a direct link. In additional or alternative aspects, the transport module 106 can communicate with remote antenna units 108a-c via an extension unit 110. For example, as depicted in FIG. 1, the transport module may communicate with the remote antenna units 108a, 108b via the extension unit 110 and communicate with the remote antenna unit 108c via a direct link. The transport module 106 can communicate with remote antenna units 108a-c and/or the extension unit 110 via any suitable communication medium (such as, but not limited to, fiber optic cable, copper cable, etc.) and any suitable communication protocol (such as, but not limited to, Ethernet).

The remote antenna units 108a-c can service the cells 109a-c. In some aspects, one or more of the remote antenna units 108a-c can include multiple antennas for receiving multiple-input/multiple-output ("MIMO") signals. The cells 109a-c can have any suitable geographic range. Non-limiting examples of the cells 109a-c include femtocells, picocells, microcells, etc. The remote antenna units can perform wideband RF communication with terminal devices in the cells 109a-c. Each of the remote antenna units 108a-c can include an optical/electrical digital transport module, an analog-to-digital converter, a digital-to-analog converter, one or more filters, an up-conversion module, a down-conversion module, a power amplifier, and a low noise amplifier.

In additional or alternative aspects, the controller 102 can provide an interface to an enterprise local area network ("LAN") 116. The LAN 116 may facilitate data communication among computing devices in a building or other area serviced by the small cell network 100. The controller 102 can provide an interface via which data traffic can be communicated between terminal devices accessing the small cell network 100 and devices the LAN 116. For example, the controller 102 can communicate a document from a terminal device accessing the small cell network 100 to a printer connected to the LAN 116.

In additional or alternative aspects, the controller 102 can provide an interface to the Internet 118 or other suitable data networks external to the building or other area serviced by the small cell network 100. The controller 102 can allow data traffic to be routed to networks other than the core networks 114a, 114b.

Figure 2:
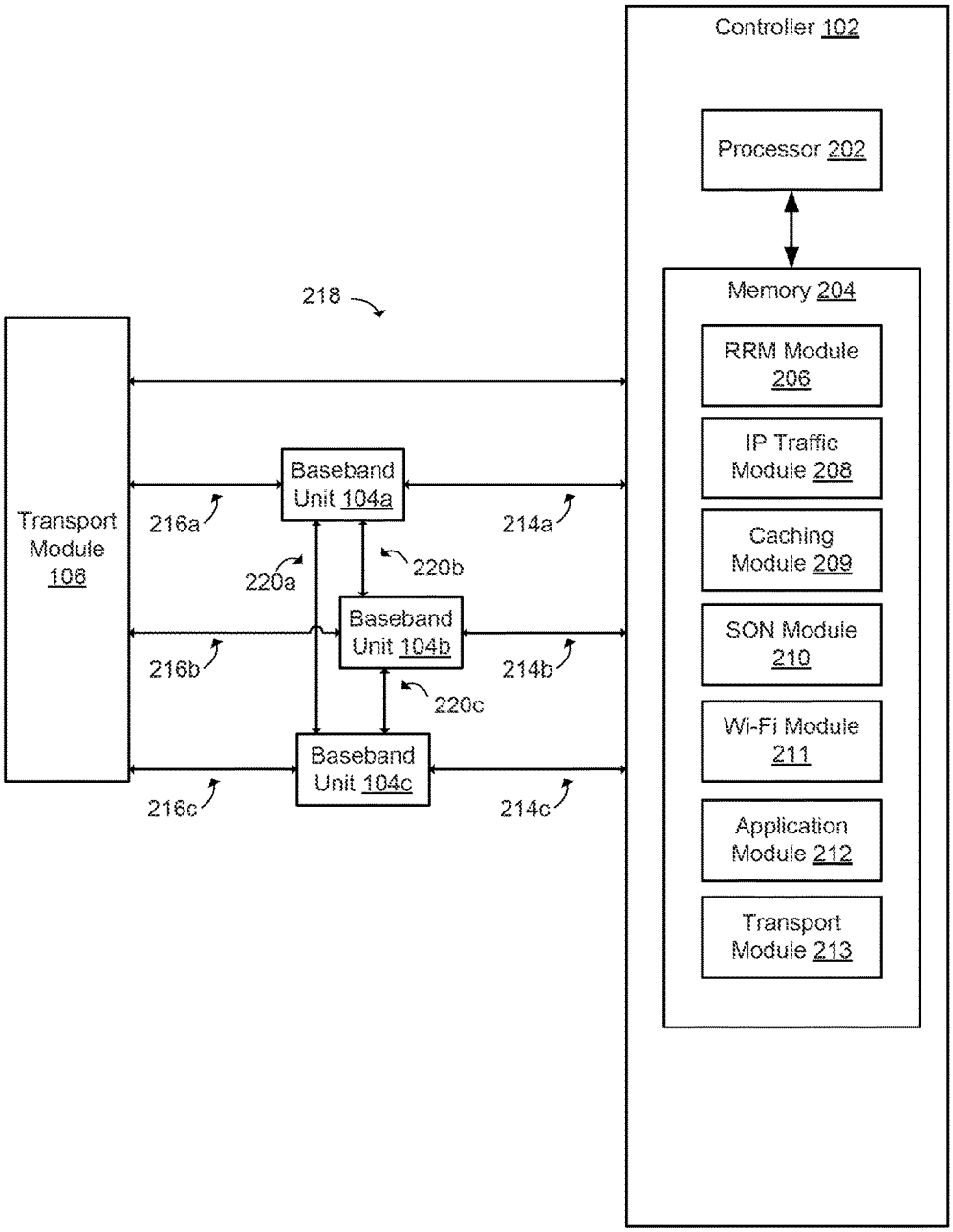
FIG. 2 is a block diagram depicting an example controller configured for managing communications with baseband units and a transport module according to one aspect.

FIG. 2 is a block diagram depicting an example controller 102 configured for managing communications with baseband units 104a-c and a transport module 106.

The controller 102 can monitor, allocate, and otherwise manage radio resources for the baseband units 104a-c. Each radio resource can include a unit of capacity for the small cell network 100 that can be scheduled and allocated to one or more of the remote antenna units 108a-c. A radio resource can be identified based on carrier frequencies assigned to the cell, a MIMO stream, and/or a cell identity for a given small cell. The controller 102 can allocate radio resources via any suitable process, such as (but not limited to) a self-organizing network ("SON") algorithm, a pre-determined scheme, etc. Radio resource management can be implemented via any suitable network protocol layer above the PHY, MAC, and RRC layers.

The controller 102 can include, among other components, processor 202 and a memory 204.

Non-limiting examples of the processor 202 include a microprocessor, an application-specific integrated circuit ("ASIC"), a state machine, or other suitable processing device. The processor 202 can include any number of processing devices, including one. The processor 202 can execute computer-executable program instructions and/or accesses information respectively stored in the memory 204.

The memory 204 can store instructions that, when executed by the processor 202, cause the processor 202 to perform operations described herein. The memory 204 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

The memory 204 can store one or more modules for managing the small cell network 100. The modules include a radio resource management ("RRM") module 206, an Internet protocol ("IP") traffic module 208, a caching module 209, a SON module 210, a Wi-Fi module 211, an application module 212, and a transport module 213. The RRM module 206, the IP traffic module 208, the caching module 209, the SON module 210, the Wi-Fi module 211, the application module 212, and/or the transport module 213 are configured to manage resources, data traffic, security, and other aspects of the small cell network 100 for multiple network operators. Each of the modules can include program code executable by the processor 202 for performing one or more functions of the controller 102.

Although depicted as separate logical modules for purposes of convenience, other implementations are possible. For example, one or more of the RRM module 206, the IP traffic module 208, the caching module 209, the SON module 210, the Wi-Fi module 211, the application module 212, and/or the transport module 213 can be combined in a common module.

The RRM module 206 can manage radio resources, route capacity among different cells, and/or manage intra-cell handover between multiple remote antenna units servicing the same cell. Managing radio resources can include optimizing the performance of the small cell network 100. Optimizing the performance of the small cell network 100 can include minimizing or otherwise reducing interference among different small cells 109a-c, different baseband units 104a-c, different network operators using the small cell network 100, etc. Managing handover can involve managing handover between different small cells and/or between small cells and macrocells. Managing handover between different small cells may involve using Iuh and/or X2 protocols. Managing handover between small cells and macrocells may involve using Iuh and/or S1 protocols.

The controller 102 can also manage radio resources used by multiple network operators. In some aspects, the controller 102 may assign a respective profile to each network operator using the small cell network 100. The profile assigned to each network operator can allow for management of radio resources specific to a network operator using the small cell network 100.

In some aspects, the controller 102 can optimize radio resource usage among the different network operators using the small cell network 100. For example, the controller 102 may provide frequency pooling for the different network operators. The frequency pooling can be implemented via hardware, software, or any suitable combination thereof in the controller 102. Frequency pooling can involve negotiating radio resources among different network operators.

In some aspects, the controller 102 can allocate capacity among the cells 109a-c such that different remote antenna units 108a-c can service different numbers of terminal devices in the cells 109a-c. The controller 102 can modify the allocation of capacity among the cells 109a-c based on a schedule and/or the load experienced by each network operator using the small cell network 100. In one non-limiting example, the number of terminal devices serviced by a first network operator may be lower than the number of terminal devices serviced by a second network operator during a given time period. The controller 102 can provide more capacity to cells servicing the number of terminal devices serviced by the second network operator the time period. In another non-limiting example, a network operator experiencing excess traffic in one or more cells may request additional capacity from the controller 102. The controller 102 can provide the additional capacity in accordance with a specified policy for allocating capacity among the network operators.

Capacity units (i.e., number of carriers, MIMO streams, and cell identifiers) can be allocated among the network operators using the small cell network 100 based on traffic loads generated by subscribers to the various network operators in a given environment. Capacity units can also be distributed based on the uplink power levels provided by the macro layers of the different network operators.

The controller 102 can provide one or more functions for RRM, IP traffic management, caching, and SON for multiple mobile network operators ("MNOs") or other network operators. Each network operator can be associated with a respective profile that is independent of profiles associated with other network operators. Each network operator can customize RRM functions, local IP access, caching policies, SON schemes, etc. in a manner specific to the network operator. The controller 102 can perform RRM functions, local IP access, caching policies, SON schemes, etc. in accordance with the various profiles for the multiple network operators.

In some aspects, the controller 102 can provide a management interface. An administrator of the small cell network 100 can access the management interface to specify that one or more network operators use a default system configuration (i.e. a system configuration (common to all the network operators). The administrator of the small cell network 100 can also access the management interface to specify that one or more network operators use system configurations specified by customized operator profiles.

In some aspects, different Operations, Administration, and Management ("OA&M") profiles can be defined via the controller 102. An OA&M profile can specify a given network operator's access to the OA&M parameters of the small cell network 100.

The IP traffic module 208 can manage IP traffic between the small cell network 100 and other data networks. The IP traffic module 208 can manage local IP traffic access ("LIPA"). LIPA can provide access to a residential, corporate, or other LAN interconnected to the small cell network 100, such as the enterprise LAN 116. LIPA can provide access to a subnet within a home or an office for shared resources such as printers, file servers, media servers, displays, etc. for a terminal device using the small cell network 100. The IP traffic module 208 can also manage selective IP traffic offload ("SIPTO") to the Internet 118. SIPTO can include selectively forwarding different types of traffic via alternative routes to or from the terminal device. For example, specific traffic can be identified by the controller 102 using a network operator policy and/or subscription policy. The identified traffic may be transferred to/from a local base station directly to the Internet 118 or another data network, thereby bypassing the core networks 114a, 114b.

The caching module 209 can manage local storage of frequently requested contents.

The SON module 210 can include one or more SON algorithms for automatically managing the small cell network 100. SON algorithms can include algorithms for automatically configuring the small cell network 100 (e.g., automatically configuring and integrating new remote antenna units), automatically optimizing the small cell network 100, and automatically healing the small cell network 100 (e.g., reducing the impacts from the failure of one or more components of the small cell network 100).

In some aspects, SON features (e.g., coverage and capacity optimizations, mobility load balancing, mobility robustness optimization, etc.) can be customized for each network operator. For example, specific intra-cell handover for the small call network 100 and interference management parameters can be used for each network operator. A non-limiting example of using customized intra-cell handover and interference management parameters includes using different biasing on pilot tones and different power measurements performed by terminal devices for each network operator.

Interference management parameters and inter-cell handover between small cell and macrocells can be adjusted depending on the macro layer radio conditions near the small cell layer (i.e., conditions with respect to macrocells from other telecommunication systems in the vicinity of the small cell network 100). For example, each network operator may experience specific macro-to-small-cell interference or interactions. The controller 102 can communicate with the different core networks 114a, 114b obtain instructions, specifications, or other data for implementing SON functions specified by centralized SON servers of each network operator. Centralized SON servers of each network operator may implement specific policies for managing interference and/or interactions between the small cells 109a-c and macrocells from other telecommunication systems in the vicinity of the small cell network 100.

In some aspects, different SON layers can respectively be implemented by the controller 102 and the core networks 114a, 114b. For example, a SON local layer implemented by the SON module 210 of the controller 102 can control interference within the small cell network 100. A respective SON centralized layer executed on each of the core networks 114a, 114b can manage interference between the small cell network 100 and macrocells from other telecommunication systems in the vicinity of the small cell network 100. Each SON centralized layer can be specific to a respective network operator.

In some aspects, a network operator may manage SON functions in a centralized SON server of a core network for the operator. The controller 102 can execute the SON module 210 to provide standard measurement feedback to a centralized SON server of the core network. The controller 102 can execute the SON module 210 to apply configuration changes to the small cell network 100 based on instructions received from the centralized SON server.

The Wi-Fi module 211 can perform Wi-Fi control functions for a wireless LAN. For example, IP traffic generated from a wireless local area network ("WLAN") controller can be routed to the remote units via the control link 218 to the transport module 106. The Wi-Fi module 211 can route IP data (e.g., Internet traffic) from the controller 102 to one or more remote antenna units 108a-c. IP data can be routed from the controller 102 to the remote antenna units 108a-c via the control link 218 to the transport module 106. The transport module 106 can communicate IP data from the controller 102 to the remote antenna units 108a-c. In some aspects, one or more of the remote antenna units 108a-c can provide Wi-Fi or other wireless data access points.

In some aspects, the Wi-Fi module 211 can implement load balancing between data services provided by the small cell network 100 and a Wi-Fi or other wireless data network servicing an area in which the small cell network 100 is deployed. For example, each network operator can implement one or more policies to offload at least some data communication to a local Wi-Fi network. The Wi-Fi module 211 can implement load balancing of data communication between the small-cell network 100 and the local Wi-Fi network or other wireless data network. The load balancing can be performed transparently to users of terminal devices serviced by the network operators using the small cell network 100.

The application module 212 can execute one or more server applications for the small-cell network 100 or another data network in communication with the controller 102. For example, the application module 212 can execute enterprise-specific applications for a system using the enterprise LAN 116.

The transport module 213 can manage backhaul links to core networks 114a, 114b of the network operators using the small cell network 100. The backhaul links can include communication links between a core network or backbone network and the small cell network 100. The backhaul links can be implemented using one or more protocols suitable for communicating transport plane data. Non-limiting examples of suitable protocols include general packet radio service ("GPRS") tunneling protocol user plane ("GTP-U"), User Datagram Protocol ("UDP"), Stream Control Transmission Protocol ("SCTP"), IP, Internet Protocol Security ("IPsec"), Ethernet, etc.

In additional or alternative aspects, the controller 102 can include one or more modules performing additional functions for managing a small cell network 100. Non-limiting examples of such functions include providing an application local server, implementing synchronization network protocols (e.g. PTP IEEE 1588v2), implement security protocols (e.g. IPsec), implementing OA&M, joint backhaul optimization, and the like.

In additional or alternative aspects, the controller 102 can perform interference management. One non-limiting example of interference management includes managing interference between different small cells. Inter-cell interference coordination can be performed based on a fractional frequency reuse by each small cell. Another non-limiting example of interference management includes managing interference between macrocells and small cells, such as controlling power control parameters associated with the downlink transmitters and/or the uplink receivers for small cells 109a-c. Small cell downlink transmitter power control can be implemented via coarse power control and/or fine power control. Coarse power control can be performed based on periodic downlink sniffing. Fine power control can be performed based on channel quality indicator statistics from terminal devices in a small cell.

The controller 102 can communicate with the baseband units via the communication links 214a-c. The communication links 214a-c can include any suitable communication medium, such as (but not limited to) copper cable, fiber optic cable, and the like. For example, the controller 102 can communicate via communication links 214a-c implemented using Ethernet cables providing an internet protocol ("IP") interface. The communication links 214a-c may allow for data communication at any suitable speed. For example, the controller 102 may communicate with the baseband units 104a-c at speeds of 100 Mbps, 1 Gbps, etc.

The controller 102 can provide control signals to the transport module 106 via the control link 218. The control link 218 can include any suitable communication medium, such as (but not limited to) an Ethernet connection or other suitable connection providing a connection speed of 1 Gbps or other suitable connection speed. The controller 102 can select the signals that are to be communicated with a specific one of the remote antenna units 108a-c. The controller 102 can provide control signals identifying the specific remote antenna units via the control link 218. The control link 218 allows the controller 102 to manage the routing of sectors across the cells 109a-c of the small cell network 100. The baseband units 104a-c can communicate complex digital signals with the transport module 106 via the communication links 214a-c.

In some aspects, the baseband units 104a-c can communicate with one another via high-speed digital interfaces 220a-c. A non-limiting example of a high-speed digital interface is a hyperlink interface. In other aspects, the high-speed digital interfaces 220a-c can be omitted. The high-speed digital interfaces 220a-c can allow two or more of the baseband units 104a-c to share processing resources, as described in greater detail with respect to FIG. 3 below.

Figure 3:
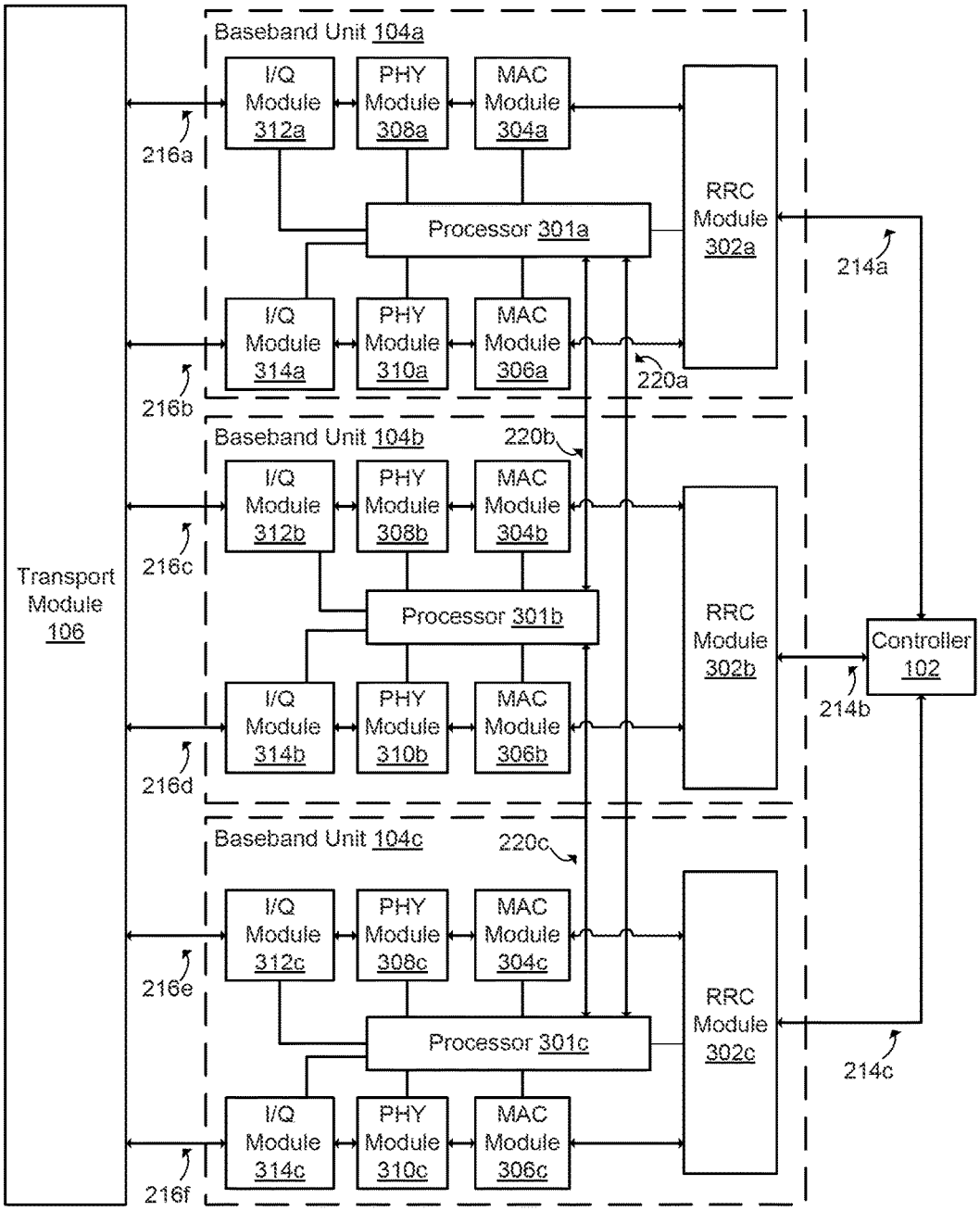
FIG. 3 is a block diagram depicting example baseband units configured for managing lower layer protocol functions for data communicated via the small cell network according to one aspect.

FIG. 3 is a block diagram depicting example baseband units 104a-c configured for managing lower layer protocol functions for data communicated via the small cell network 100. Each of the baseband units 104a-c can respectively include processors 301a-c, RRC modules 302a-c, PHY modules 308a-c, 310a-c, and I/Q modules 312a-c, 314a-c.

The baseband units 104a-c can manage lower layer protocol functions for data communicated via the small cell network 100 using any suitable telecommunication standard. Non-limiting examples of suitable telecommunication standards include 3G and 4G standards.

One or more of the baseband units 104a-c can process data communicated using a given network operator. A baseband unit for a given network operator can communicate with one of the core networks 114a, 114b via the controller 102. Each of the baseband units 104a-c can communicate with the remote antenna units 108a-c via the transport module 106.

In some aspects, each of the baseband units 104a-c can perform processing related to a respective one of the cells 109a-c. In some aspects, each of the baseband units 104a-c can manage communication for a separate network operator. In other aspects, groups of the baseband units 104a-c can collectively manage communication for a given network operator.

The baseband units 104a-c may perform physical layer processing via the PHY modules 308a-c, 310a-c. The baseband units 104a-c may perform MAC layer processing via the MAC modules 304a-c, 306a-c. The baseband units 104a-c may perform RRC processing via the RRC modules 302a-c. The processors 301a-c can coordinate the operations of the various other modules of the baseband units 104a-c.

In some aspects, the baseband units 104a-c can implement pooling of baseband processing resources. The processors 301a-c of the baseband units 104a-c of the baseband units 104a-c can be interconnected via the high-speed digital interfaces 220a-c. Baseband processing tasks can be distributed among the baseband units 104a-c based on capacity requirements for a given network operator. In some aspects, the baseband units 104a-c may not be linked to specific network operators. The baseband units 104a-c can be shared as capacity units able to deliver multi-radio access technology, multi-network operator services, multiple telecommunication technologies (e.g., 3G, 4G), etc. The controller 102 can manage the pooling of baseband processing resources among the baseband units 104a-c based on sharing policies for the network operators.

In some aspects, each network operator may use multiple technologies for providing wireless communication in the cells 109a-c. For example, a network operator may provide both long-term evolution ("LTE") and Universal Mobile Telecommunications System ("UMTS") communication services for terminal devices via the small cell network 100. A baseband unit 104a managing communications for a first network operator can include PHY modules 308a, 310a for respectively processing LTE and UMTS communications. A MAC module 304a can provide MAC layer processing of LTE communications and a MAC module 306a can provide MAC layer processing of UMTS communications. A baseband unit 104b managing communications for a second network operator can include PHY modules 308b, 310b for respectively processing LTE and UMTS communications. A MAC module 304b can provide MAC layer processing of LTE communications and a MAC module 306b can provide MAC layer processing of UMTS communications. A baseband unit 104b managing communications for a second network operator can include PHY modules 308c, 310c for respectively processing LTE and UMTS communications. A MAC module 304b can provide MAC layer processing of LTE communications and a MAC module 306b can provide MAC layer processing of UMTS communications.

In additional or alternative aspects, one or more of the baseband units 104a-c may be configured to process MIMO data streams. For example, a network operator may implement LTE using MIMO. The baseband unit can include multiple PHY modules respectively performing PHY layer processing for each MIMO stream, thereby providing parallel processing chains.

Each of the I/Q modules 312a-c, 314a-c can convert a data stream received from a respective one of the PHY modules 308a-c, 310a-c into a complex digital signal including an I and a Q component. The complex digital signals can be provided to the transport module 106 via suitable I/Q interfaces provided by the communication links 216a-f. The communication links 216a-f can include any communication medium suitable for providing a digital interface for communicating I/Q samples. The digital interface can be a serial digital interface or a parallel digital interface.

Figure 4:
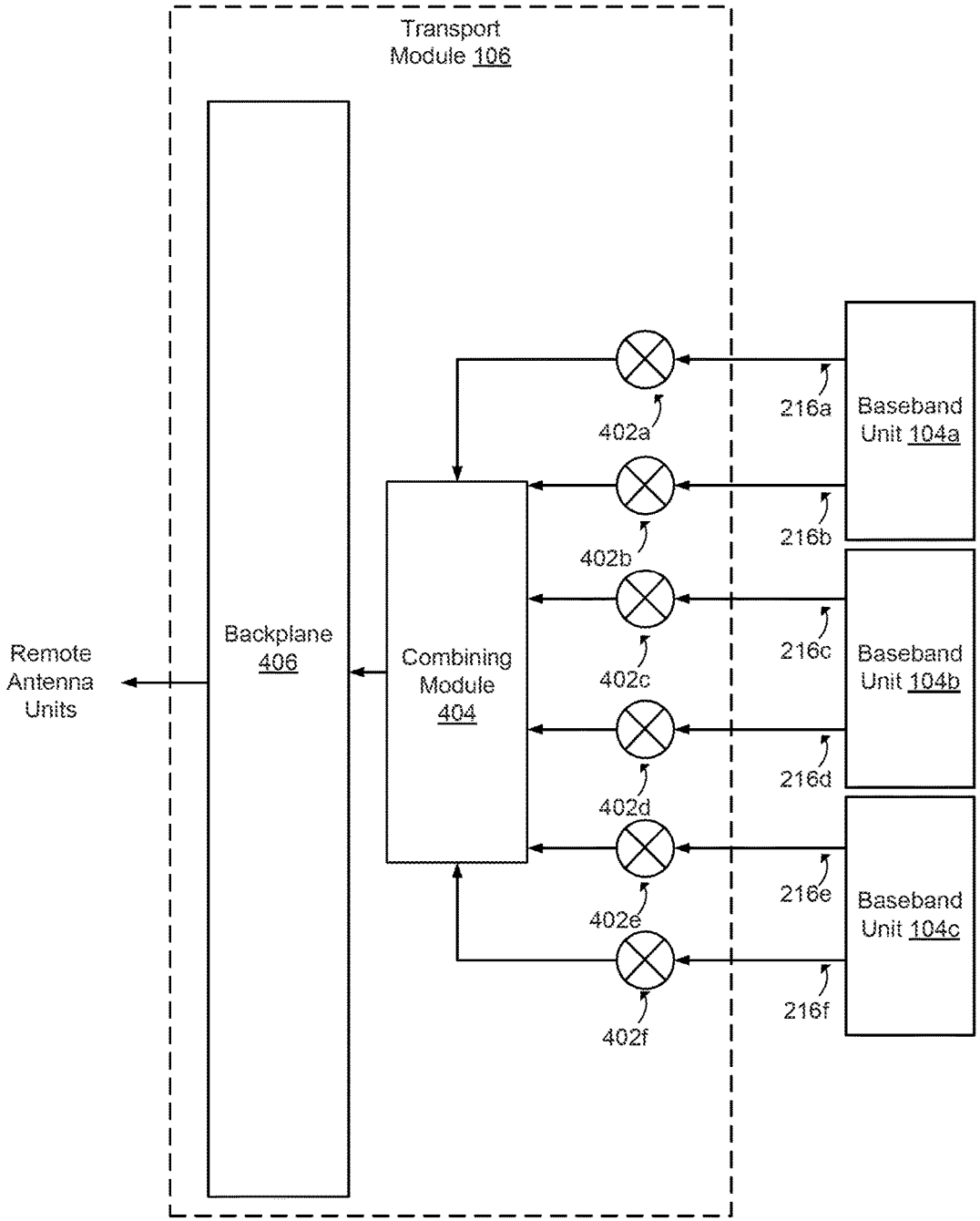
FIG. 4 is a block diagram depicting an example transport module in communication with the baseband units according to one aspect.

FIG. 4 is a block diagram depicting an example transport module 106 in communication with the baseband units 104a-c. The mixers 402a-f can combine the I and Q components of the complex digital signals received via the communication links 216a-f and output digital signals. A combining module 404 (such as, but not limited to, a summer) can combine the digital signals outputted from the mixers 402a-f. The combining module 404 can provide the combined digital signal to the backplane 406 for routing to one or more of the remote antenna units 108a-c. The backplane 406 can include optical-to-electrical conversions devices for routing signals to the remote antenna units 108a-c.

The foregoing description of aspects and features of the invention, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example. The illustrative examples described above are given to introduce the reader to the general subject matter discussed here and are not intended to limit the scope of the disclosed concepts.

What is claimed is:

1. A management sub-system for managing a small cell network servicing a plurality of network operators, the [system] *management sub-system* comprising:

[a] controller *circuitry* in communication with a plurality of core networks, wherein each of the plurality of core networks is operated by a separate network operator providing telecommunication services to terminal devices; and a plurality of baseband processing units in communication with the controller *circuitry*, wherein each of the plurality of baseband processing units is configured to process data from at least one respective core network of the plurality of core networks for distribution via a plurality of remote antenna units of the small cell network;

wherein the plurality of remote antenna units are remotely located from the plurality of baseband processing units;

wherein at least one of the plurality of remote antenna units is remotely located from at least one other remote antenna unit;

wherein the management sub-system is configured for providing a respective amount of capacity via the small cell network for each core network of the plurality of core networks based on a respective subset of the plurality of baseband processing units assigned to the core network; and wherein the controller *circuitry* is configured to provide, independently for each network operator, (a) small cell and macro cell handover management and (b) small cell and macro cell interference management.

2. The management sub-system of claim 1, wherein the controller *circuitry* is configured to allocate radio resources provided by the small cell network among the plurality of network operators.

3. The management sub-system of claim 2, wherein the controller *circuitry* is configured to allocate the radio resources by:

determining, for each of the plurality of network operators, a respective number of terminal devices communicating with a respective core network of the network operator via the small cell network; and allocating a respective portion of the radio resources to each network operator based on the respective number of terminal devices.

4. The management sub-system of claim 1, wherein the controller *circuitry* is further configured to minimize interference between signals communicated from the plurality of core networks to the plurality of remote antenna units.

5. The management sub-system of claim 1, wherein the controller *circuitry* is further configured to communicate signals between at least one data network other than the plurality of core networks and at least one of the terminal devices.

6. The management sub-system of claim 1, wherein the controller *circuitry* is further configured to automatically [integrate] *configure* additional remote antenna units into the small cell network.

7. The management sub-system of claim 1, wherein the controller *circuitry* is further configured to automatically [reduce impacts from the] *perform self-healing in response to a* failure of at least one component of the small cell network.

8. The management sub-system of claim 1, wherein each of the plurality of baseband processing units is further configured to provide media access control for the respective core network.

9. The management sub-system of claim 1, wherein each of the plurality of baseband processing units is further configured to provide radio resource control for the respective core network.

10. The management sub-system of claim 1, further comprising a combiner and backplane system in communication with the plurality of baseband processing units and the controller *circuitry*, wherein the combiner and backplane system *is* configured to communicate signals between the plurality of baseband processing units and the plurality of remote antenna units of the small cell network; and wherein the controller *circuitry* is further configured to coordinate communication of signals from different core networks by the combiner and backplane system to a common cell serviced by at least one of the plurality of remote antenna units.

11. A small cell network for servicing a plurality of network operators, the small cell network comprising:

a management sub-system comprising:

[a] controller *circuitry* in communication with a plurality of core networks, wherein each of the plurality of core networks is operated by a separate network operator providing telecommunication services to terminal devices, wherein the controller *circuitry* is configured to provide, independently for each network operator, (a) small cell and macro cell handover management and (b) small cell and macro cell interference management, a plurality of baseband processing units in communication with the controller *circuitry*, wherein each of the plurality of baseband processing units is configured to process data from at least one respective core network of the plurality of core networks for distribution via a plurality of remote antenna units of the small cell network, wherein the management sub-system is configured for providing a respective amount of capacity via the small cell network for each core network of the plurality of core networks based on a respective subset of the plurality of baseband processing units assigned to the core network, and a combiner and backplane system in communication with the plurality of baseband processing units, wherein the combiner and backplane system is configured to communicate signals between the plurality of baseband processing units and a plurality of remote antenna units;

the plurality of remote antenna units;

wherein the plurality of remote antenna units are remotely located from the plurality of baseband processing units; and wherein at least one of the plurality of remote antenna units is remotely located from at least one other remote antenna unit.

12. The small cell network of claim 11, wherein the controller *circuitry* is configured to allocate radio resources provided by the small cell network among the plurality of network operators.

13. The small cell network of claim 12, wherein the controller *circuitry* is configured to allocate the radio resources by:

determining, for each of the plurality of network operators, a respective number of terminal devices communicating with a respective core network of the network operator via the plurality of remote antenna unit; and allocating a respective portion of the radio resources to each network operator based on the respective number of terminal devices.

14. The small cell network of claim 11, wherein the controller *circuitry* is further configured to minimize interference between signals communicated from the plurality of core networks to the plurality of remote antenna units.

15. The small cell network of claim 11, wherein the controller *circuitry* is in communication with the combiner and backplane system via a control link bypassing the plurality of baseband processing units, wherein the controller *circuitry* is further configured to:

generate control signals for coordinating communication of signals by the combiner and backplane system from different core networks to a common cell serviced by at least one of the plurality of remote antenna units; and provide the control signals to the combiner and backplane system via the control link.

16. The small cell network of claim 11, wherein the controller *circuitry* is further configured to communicate signals between at least one data network other than the plurality of core networks and at least one of the terminal devices.

17. The small cell network of claim 11, wherein the controller *circuitry* is further configured to automatically [integrate] *configure* additional remote antenna units.

18. The small cell network of claim 11, wherein the controller *circuitry* is further configured to automatically [reduce impacts from the] *perform self-healing in response to a* failure of at least one component of the small cell network.

19. The small cell network of claim 11, wherein each of the plurality of baseband processing units is further configured to provide media access control for the respective core network.

20. The small cell network of claim 11, wherein each of the plurality of baseband processing units is further configured to provide radio resource control for the respective core network.

*21. A management sub-system for managing a small cell network servicing a plurality of network operators, the management sub-system comprising:*

*controller circuitry in communication with a plurality of core networks, wherein each of the plurality of core networks is operated by a separate network operator providing telecommunication services to terminal devices; and*

*a plurality of baseband processing units in communication with the controller circuitry, wherein each of the plurality of baseband processing units is configured to process data from at least one respective core network of the plurality of core networks for distribution via a plurality of remote antenna units of the small cell network;*

*wherein the plurality of remote antenna units are remotely located from the plurality of baseband processing units;*

*wherein at least one of the plurality of remote antenna units is remotely located from at least one other remote antenna unit;*

*wherein the management sub-system is configured to provide a respective amount of capacity via the small cell network for each core network of the plurality of core networks based on a respective subset of the plurality of baseband processing units assigned to the core networks;*

*wherein the controller circuitry comprises a self-organizing network (SON) module configured to communicate with a respective centralized SON server for each core network of the plurality of core networks;*

*wherein the controller circuitry is configured to provide standard management feedback to the respective centralized SON server for each core network of the plurality of core networks; and*

*wherein the controller circuitry is configured to apply respective configuration changes to the small cell network based on instructions received from the respective centralized SON server for each core network of the plurality of core networks.*

*22. The management sub-system of claim 21, wherein the controller circuitry is configured to provide a standard interface for communicating with the core networks.*

*23. The management sub-system of claim 21, wherein the management sub-system is configured to communicate with the plurality of remote antenna units of the small cell network using an Ethernet communication protocol.*

*24. A small cell network to provide respective cell service for a plurality of network operators, the small cell network comprising:*

*a plurality of baseband processing units in communication with a plurality of core networks, wherein each of the plurality of core networks is operated by a separate network operator providing telecommunication services to terminal devices;*

*controller circuitry in communication with the plurality of baseband processing units; and*

*a plurality of remote antenna units communicatively coupled to the plurality of baseband processing units using an Ethernet communication protocol;*

*wherein the plurality of remote antenna units are remotely located from the plurality of baseband processing units;*

*wherein at least one of the plurality of remote antenna units is remotely located from at least one other remote antenna unit;*

*wherein the controller circuitry is configured to provide a respective amount of capacity via the small cell network for each core network of the plurality of core networks based on a respective subset of the plurality of baseband processing units assigned to the core network, the respective subset of the plurality of baseband processing units assigned to each core network of the plurality of core networks configured to process data for the core network; and*

*wherein the small cell network is configured to provide a standard interface to communicate with the controller circuitry in connection with each network operator of the plurality of network operators separately managing the respective cell service provided therefor by the small cell network.*

*25. The small cell network of claim 24, wherein the controller circuitry is configured to receive requests from one or more of the network operators and to respond to the requests in accordance with a predetermined policy.*

*26. The small cell network of claim 25, wherein the requests comprise requests for additional capacity and wherein the controller circuitry is configured to provide the additional capacity in accordance with a specified policy for allocating capacity among the network operators.*

*27. The small cell network of claim 24, wherein each of the remote antenna units is communicatively coupled to the plurality of baseband processing units using a respective direct link.*

*28. The small cell network of claim 24, wherein at least one of the remote antenna units is communicatively coupled to the plurality of baseband processing units using at least one extension unit between said at least one of the remote antenna units and the plurality of baseband processing units.*

*29. The small cell network of claim 24, wherein the controller circuitry is configured to provide, independently*

*for each network operator, (a) small cell and macro cell handover management and (b) small cell and macro cell interference management.*

*30. The small cell network of claim 24, wherein the controller circuitry is configured to apply respective configuration changes to the small cell network based on respective instructions received from each network operator.*

*31. The small cell network of claim 24, wherein the controller circuitry is configured to provide standard measurement feedback to each network operator of the plurality of network operators.*

*32. The small cell network of claim 24, wherein the controller circuitry is configured to execute at least one server application for the small cell network.*

* * * * *